UNITED STATES PATENT OFFICE 2,636,021

RESINOUS CONDENSATION PRODUCT OF DIBENZALACETONE AND HYDROGEN SULFIDE

Ralph B. Thompson, Hinsdale, Ill., assignor to Universal Oil Products Company, Chicago, Ill., a corporation of Delaware No Drawing. Application May 25, 1949, Serial No. 95,367

1 Claim. (Cl. 260—63)

This application is a continuation-in-part of my copending application Serial Number 764,568 filed July 29, 1947, now abandoned.

This invention relates to a process for preparing resins and more particularly for the preparation of resins containing sulfur.

An object of this invention is to form a resin containing sulfur.

Another object of this invention is to form a thermoplastic resin.

One specific embodiment of this invention relates to a process for preparing a thermoplastic resin which comprises reacting approximately equimolecular proportions of a di-$\alpha,\beta$-unsaturated ketone and a sulfur compound in which each of two hydrogen atoms is attached to a divalent sulfur atom.

Another embodiment of this invention relates to a process for preparing a resin which comprises reacting approximately equimolecular proportions of a di-$\alpha,\beta$-unsaturated ketone and hydrogen sulfide.

A further embodiment of this invention relates to a process for preparing a resin which comprises reacting approximately equimolecular proportions of a di-$\alpha,\beta$-unsaturated ketone and an alkane dithiol.

A still further embodiment of this invention relates to a process for preparing a resin which comprises reacting approximately equimolecular proportions of a di-$\alpha,\beta$-unsaturated ketone and ethane dithiol.

It is unexpected to obtain a resin by the reaction of a di-$\alpha,\beta$-unsaturated ketone with hydrogen sulfide which contains two hydrogen atoms attached to a divalent sulfur atom. For example, the reaction of hydrogen sulfide with an unsaturated ketone of the formula $$R-\overset{H}{C}=\overset{H}{C}-\overset{O}{\underset{\|}{C}}-\overset{H}{C}=\overset{H}{C}-R'$$

would be expected to form a cyclic monomeric compound as the possibility exists for the closing of a 6-membered ring to produce a compound of the following formula:

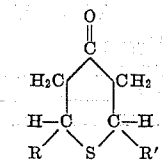

in which R and R' (as in the aforementioned unsaturated ketone) represent members of the group consisting of a hydrogen atom and an alkyl group. The ring compound is not formed but instead there is produced a resin that may be represented by the general formula:

$$\left[-\overset{H}{\underset{R}{\overset{|}{C}}}-\overset{H}{\underset{H}{\overset{|}{C}}}-\overset{O}{\underset{\|}{C}}-\overset{H}{\underset{H}{\overset{|}{C}}}-\overset{H}{\underset{R}{\overset{|}{C}}}-S-\right]_n$$

The di-$\alpha,\beta$-unsaturated ketones used as starting materials in this process may be represented by the formula:

$$R^1-\overset{R^2}{\underset{|}{C}}=\overset{R^3}{\underset{|}{C}}-\overset{O}{\underset{\|}{C}}-\overset{R^4}{\underset{|}{C}}=\overset{R^5}{\underset{|}{C}}-R^6$$

in which each of $R^1$ to $R^6$, inclusive, is selected from the group consisting of hydrogen, an alkyl radical, an aryl radical, a cycloalkyl radical, an alkaryl radical, an aralkyl radical, a heterocyclic radical, such as furyl, thienyl, pyridyl radical, and the like. Each of the groups $$R^1-\overset{R^2}{\underset{|}{C}}=$$

and $$=\overset{R^5}{\underset{|}{C}}-R^6$$

may also be a cycloalkane ring which may be represented by the formula:

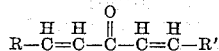

Preferably the ketone has at least one hydrogen atom in each of the beta positions. Typical di-$\alpha,\beta$-unsaturated ketones include dibenzalacetone, difurfuralacetone, phorone, dicyclohexylidenecyclohexanone, dicinnamalacetone, dicyclohexylideneacetone, etc.

Sulfur compounds which are reacted with di-$\alpha,\beta$-unsaturated ketones as herein set forth contain two active hydrogen atoms each of which is attached to a divalent sulfur atom. Such sulfur compounds are represented by the formula H—Q—H in which Q is a sulfur-containing radical in which both hydrogen atoms are attached to divalent sulfur. Examples of such sulfur compounds are hydrogen sulfide (H—S—H) and an alkane dithiol of the formula $$H-S-(\overset{|}{\underset{|}{C}})_n-S-H$$

in which $n$ is an integer (generally 1 to 5) and each of the unsaturated bonds is attached to a member of the group consisting of hydrogen and a hydrocarbon group, preferably an alkyl group.

Ethanedithiol, and 1,2-propanedithiol are such preferred sulfur compounds.

Approximately equimolecular proportions of a di-$\alpha,\beta$-unsaturated ketone and a sulfur compound of the above-indicated type H—Q—H condense to form a resin particularly in the presence of a catalyst which may be either basic or acidic. Suitable basic catalysts include piperidine, sodium methylate, and other alkali metal alcoholates, a quaternary ammonium hydroxide, such as trimethylbenzyl ammonium hydroxide and the like. Suitable acidic catalysts comprise anhydrous hydrogen chloride, hydrogen bromide, also phosphorus pentoxide, tetraphosphoric acid, and the like.

Heretofore mercaptoalkanones have been produced by reacting phorone (an unsaturated ketone) with hydrogen sulfide but for this purpose it was necessary to react one molecule of hydrogen sulfide with each double bond present in the unsaturated ketone. On the contrary, in my process, it is essential to have only one hydrogen sulfide molecule present for each two double bonds. In the prior art process for producing mercaptoalkanones, an excess of the theoretical amount of hydrogen sulfide was used and accordingly these proportions would not lead to resin formation. In my process, approximately equimolecular proportions of the sulfur compound and the ketone having two double bonds per molecule are reacted to produce a thermosetting resin which may be formed into articles such as cups, radio-cases, toilet articles (brushes, combs, etc.) tile, toys, etc., or used in the production of protective and decorative coatings for wood, metal, paper, etc.

The condensation of hydrogen sulfide and dibenzalacetone to form a resin is illustrated by the following equation:

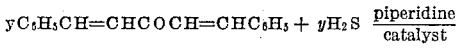

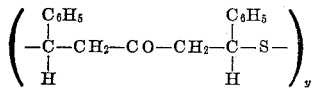

The resultant product which is of relatively high molecular weight is a clear thermoplastic resin, containing dibenzlyacetone groups linked together by sulfur.

This process is carried out either batchwise or in continuous operation by mixing substantially equimolecular proportions of the diolefinic ketone and sulfur compound and contacting the mixture with a catalyst. For example, the di-$\alpha,\beta$-unsaturated ketone and sulfur compound, such as hydrogen sulfide, are mixed under pressure at a temperature of about 20° C. and piperidine or another suitable catalyst is added to the mixture. Reaction is evidenced by the evolution of heat which is generally quite rapid. However, the vigor of this condensation reaction is dependent upon the chemical structure and the reactivity of the diolefinic ketone and sulfur compounds or mixtures of such sulfur compounds undergoing the condensation reaction.

In this process, when producing resins from some of the least reactive olefinic ketones and sulfur compounds, it may also be desirable to heat the reaction mixture under pressure generally to a temperature of not more than about 150° C. by means of a water or oil bath, a superheated steam bath, or some other suitable means to increase the speed of the condensation reaction. Sometimes the reactants are mixed with an inert diluent such as a hydrocarbon or an ester, for example, pentane, cyclohexane, ethyl acetate, etc., before the mixture is contacted with the catalyst.

After the reaction, unconverted starting materials are separated from the condensation products by fractional distillation or other suitable means and the unconverted starting materials may thereafter be recycled to the process. The resinous condensation product which remains as a distillation residue, preferably as a residue from a vacuum distillation, is then suitable for use as a thermoplastic resin. Also as shown hereinafter (Example I) a partly resinified resin can be obtained, either as a solution or as a soft resin which can be caused to set in place by heating.

The process is illustrated further by the following examples which should not be misconstrued to limit unduly the generally broad scope of the invention.

*Example I*

To a suspension of dibenzalacetone (23.4 g., 0.1 mole) in ethyl acetate (50 cc.) cooled in ice was added piperidine (0.5 cc.) and hydrogen sulfide (3.5 g.) bubbled in. It was allowed to stand for one hour at room temperature, washed with dilute sulfuric acid to remove the piperidine, dried over calcium chloride, filtered, and evaporated. After evaporation of the solvent the product was no longer soluble in ethyl acetate but instead was a soft very pale yellow resin. Heating in a bath to 140–150° C. converted it to a hard clear resin.

*Example II*

Following the procedure of Example I, difurfuralacetone and hydrogen sulfide were reacted at 20° C. in the presence of piperidine catalyst. After evaporation of the ethyl acetate solvent which was also used in this run, a resin was obtained with a lower softening point than that obtained in Example I, and with a red color.

*Example III*

One part by weight of pulverized resin prepared as described in Example I was mixed with three parts by weight of wood flour and the resulting mixture was molded under pressure at a temperature of 80 to 85° C. to form sheets having considerable strength and useful as parts of radio cabinets, panels for mounting electric switches, and the like.

I claim as my invention:

A resinous condensation product of approximately equimolecular proportions of dibenzalacetone and hydrogen sulfide.

RALPH B. THOMPSON.

References Cited in the file of this patent

UNITED STATES PATENTS

| Number | Name | Date |
|---|---|---|
| 2,212,150 | Burke | Aug. 20, 1940 |
| 2,327,966 | Morey | Apr. 25, 1944 |
| 2,347,182 | Coffman | Apr. 25, 1944 |